United States Patent
Wen et al.

(10) Patent No.: US 9,705,165 B2
(45) Date of Patent: Jul. 11, 2017

(54) LITHIUM-AIR BATTERY AIR ELECTRODE AND ITS PREPARATION METHOD

(75) Inventors: Zhaoyin Wen, Shanghai (CN); Yanming Cui, Shanghai (CN); Yu Liu, Shanghai (CN); Xiangwei Wu, Shanghai (CN); Jingchao Zhang, Shanghai (CN)

(73) Assignee: SHANGHAI INSTITUTE OF CERAMICS, CHINESE ACADEMY OF SCIENCES, Shanghai (CN)

( * ) Notice: Subject to any disclaimer, the term of this patent is extended or adjusted under 35 U.S.C. 154(b) by 1171 days.

(21) Appl. No.: 13/979,803

(22) PCT Filed: Aug. 31, 2011

(86) PCT No.: PCT/CN2011/001468
§ 371 (c)(1),
(2), (4) Date: Mar. 5, 2014

(87) PCT Pub. No.: WO2012/027961
PCT Pub. Date: Mar. 8, 2012

(65) Prior Publication Data
US 2016/0190667 A1 Jun. 30, 2016

(30) Foreign Application Priority Data
Aug. 31, 2010 (CN) .......................... 2010 1 0266848

(51) Int. Cl.
H01M 12/06 (2006.01)
H01M 4/86 (2006.01)
(Continued)

(52) U.S. Cl.
CPC ............ H01M 12/06 (2013.01); C25D 13/12 (2013.01); H01M 4/8605 (2013.01);
(Continued)

(58) Field of Classification Search
CPC .......... H01M 8/02; H01M 8/14; H01M 12/06; H01M 4/8605; H01M 4/8807;
(Continued)

(56) References Cited

U.S. PATENT DOCUMENTS 3,793,083 A   2/1974 Paynter
6,368,751 B1  4/2002 Yao et al.
(Continued)

FOREIGN PATENT DOCUMENTS

CN     1226289    8/1999
CN     1253385    5/2000
(Continued)

OTHER PUBLICATIONS

Wang et al., "High electrocatalytic performance of $Mn_3O_4$/mesoporous carbon composite for oxygen reduction in alkaline solutions," Chem. Mater. 2007, vol. 19, No. 8, pp. 2095-2101.
(Continued)

Primary Examiner — Mark F Huff
Assistant Examiner — Monique Wills
(74) Attorney, Agent, or Firm — Hamre, Schumann, Mueller & Larson P.C.

(57) ABSTRACT

The present invention provides a lithium-air battery air electrode, the air electrode comprises: a collector, an in-situ loading catalyst on collector. The invention also provides a preparation method of the air electrode for lithium-air batteries and the lithium-air batteries. The air electrode of the present invention can greatly improve the performance of the lithium-air battery.

13 Claims, 2 Drawing Sheets

(51) Int. Cl.
  *H01M 4/88* (2006.01)
  *H01M 12/08* (2006.01)
  *C25D 13/12* (2006.01)
  *H01M 4/90* (2006.01)

(52) U.S. Cl.
  CPC ....... *H01M 4/8807* (2013.01); *H01M 4/8853* (2013.01); *H01M 12/08* (2013.01); *H01M 4/8846* (2013.01); *H01M 4/90* (2013.01); *H01M 4/9016* (2013.01); *H01M 2220/20* (2013.01); *Y02E 60/128* (2013.01)

(58) Field of Classification Search
  CPC .. H01M 4/8846; H01M 4/8853; H01M 4/901; H01M 12/08; Y02E 60/128
  See application file for complete search history.

(56) References Cited

U.S. PATENT DOCUMENTS

| | | | | |
|---|---|---|---|---|
| 2004/0147104 | A1* | 7/2004 | Lin | H01L 21/32051 438/598 |
| 2005/0026031 | A1 | 2/2005 | McKenzie et al. | |
| 2008/0176124 | A1 | 7/2008 | Imagawa et al. | |
| 2010/0143807 | A1* | 6/2010 | Khasin | B01J 21/066 429/405 |
| 2011/0059355 | A1* | 3/2011 | Zhang | H01M 4/8647 429/188 |

FOREIGN PATENT DOCUMENTS

| | | |
|---|---|---|
| CN | 101267057 | 9/2008 |
| CN | 101425581 | 5/2009 |
| EP | 2254192 | 11/2010 |
| WO | 01/28011 | 4/2001 |
| WO | 01/69704 | 9/2001 |
| WO | 2009/104570 | 8/2009 |

OTHER PUBLICATIONS

Lu et al., "Platinum-gold nanoparticles: a highly active bifunctional electrocatalyst for rechargeable lithium-air batteries," J. Am. Chem. Soc., 2010, vol. 132, No. 35, pp. 12170-12171.
International Search Report of PCT/CN2011/001468 dated Nov. 10, 2011 (6 pages total).

* cited by examiner

LITHIUM-AIR BATTERY AIR ELECTRODE AND ITS PREPARATION METHOD

SUMMARY OF THE INVENTION

Technical Field

The present invention relates to a design can be used for the air electrode of lithium-air battery and its preparation, which belongs to the field of chemical battery.

Background of the Invention

With the development of portable electronic products or electric vehicles, there is a urgent need for a battery with smaller size but higher energy density. For the currently used lithium-ion battery, due to its structural limitations, there is a limited space of further increasing the capacity. Therefore, we must hunt for a new battery system. The lithium-air battery could be a promising candidate, and the active material of oxygen for the positive electrode is not needed to be carried in the battery, but provided from the surrounding air. The theoretical energy density is as high as 1,3200 Wh/kg, which is by far the highest one and gradually become a hot research domestic and foreign.

However, the practical capacity of the lithium-air battery is constrained by the micro-structure of the air electrode. The conventional air electrode is mainly composed of the catalyst, the catalyst support and the binder. The insoluble discharge products (lithium oxide or lithium peroxide) will deposit in the pores of the micro-structure of the air electrode (mainly the support material), then at last block the air electrode, preventing the contact of the electrolyte and the oxygen, resulting in that the discharge is terminated and the practical capacity is limited. In addition, the catalytic activity of the catalyst will determine the charge-discharge efficiency of the battery. It is very important to design microstructure of the air electrode for the practical application and popularization of the lithium-air battery.

For the above two points, the studies of the air electrode of lithium-air batteries are mainly divided into two major directions: the design of a new structure for the air electrode or the development of highly active catalyst. Designing novel structure which could accommodate more insoluble discharge products, or reducing the amount of the non-active material in the air battery so that it could obtain a higher specific mass capacity could be the effective ways to improve cell performance. Usually the preparation of carbon material with a high porosity as a support can increase the specific capacity of the battery. For example Yao et al (Chemistry of Materials, 19 (2007) 2095-2101) proposed ordered mesoporous carbon CMK-3 as the catalyst support, but the result showed that only limited capacity value was increased. The catalyst, although it is not involved in the battery reaction of charge and discharge, plays a critical role in the battery, which not only determines the charge/discharge voltages of the lithium air battery and round-trip efficiency, but also affects the reversibility of the battery. Usually the development of the catalyst with higher catalytic activity for oxygen evolution reaction and oxygen reduction reaction or the employment of the technology to increase uniform dispersion of the catalyst can improve the efficiency of lithium-air battery. Yi-Chun Lu et al (Journal of American Chemical Society, 2010, Article In press) proposed noble metal Pt, Au or the alloy of the two as the catalyst. Although it did reduce the charge voltage of the lithium-air battery, due to the high cost of the noble metals, it is difficult to be widely used in the practical lithium-air batteries. Therefore the design of a suitable air electrode becomes the key to the development of high-performance lithium-air batteries.

In summary, the field is in the lack of a lithium air electrode which can greatly improve the performance of lithium-air batteries, and it is an urgent to develop such a lithium air electrode.

SUMMARY OF THE INVENTION

The first object of the present invention is to provide a lithium-air electrode which can greatly improve the performance of the lithium-air batteries.

The second object of the present invention is to provide a method of preparation of the high-performance lithium-air electrode for e a lithium air battery.

A third object of the present invention is to provide a high-performance lithium-air battery.

First aspect of the present invention is to provide an air electrode of lithium-air battery, said air electrode comprises:
  collector (or current collector),
  in-situ catalyst which is loaded in-situ on the collector.

In a preferred example, the catalyst is uniformly distributed on the surface of the current collector, and the catalyst is fibrous, tubular, rod-like or needle-like.

Preferably, the catalyst is fibrous. The catalyst and the current collector together form a porous structure.

In a specific example of the present invention, the air electrode of lithium-air batteries consists of (or composed of) the collector and catalyst on the collector, without a binder (binder free).

More preferably, the air electrode of the lithium-air battery is comprised by the current collector and the catalyst in-situ loaded on the collector.

In a specific example of the present invention, the porosity of said collector is ≥90%, ppi (pore and/inch number of holes/inch)=100-300 and pore diameter of 10-500 μm.

Preferably, ppi is 100-140.

Preferably, the current collector has a three-dimensional structure.

In a specific example of the present invention, the current collector is selected from the porous collector group which has the electron conductivity of 5 to 64 MS/m and the redox potential of −0.250−−1V. Determined by metal material conductivity tester and the standard electrode potential method.

More preferably, selected from the following collectors:
(I) A porous metal collector, preferably metal Ni foam, Ti foam, Au foam or Pt foam; or
(II) A porous non-metallic collector, preferably C foam or porous Si.

In a specific example of the present invention, the catalyst is selected from the catalyst group demonstrated with the oxygen evolution reaction potential of 3.1-4.5 V and oxygen reduction potential range of 2.5-3.1 V, determined by the cyclic voltammetric method.

In a specific example of the present invention, the catalysts as mentioned are chosen from the following one or more of groups with electrochemical catalytic activity:
  (I) Pure Metal, preferably Pt, Au, Ag, Au, Co, Zn, V, Cr, Pd, Rh, Cd, Nb, Mo, Ir, Os, Ru, Ni or their combinations; or alloys formed by metal elements mentioned above;
  (II) Single metal oxide, specifically as $Co_3O_4$, $MnO_2$, $Mn_2O_3$, CoO, ZnO, $V_2O_5$, MoO, $Cr_2O_3$, $Fe_3O_4$, $Fe_2O_3$, FeO, CuO, NiO or their combinations;
  (III) Mixed metal oxide, specifically as in Spinel, Pyrochlore, Perovskite or their combinations.

More Preferably, catalyst is $Co_3O_4$.

In a specific example of the present invention, the loading of catalyst is 1-10 mg/1 $cm^2$ of the current collector.

In a specific example of the present invention, volume equivalent diameter of the catalyst is 100 nm-1000 nm.

Second aspect of the present invention is to provide preparation method for air electrode for lithium-air battery, including:

Provide current collector;

Load catalyst onto the current collect by in-situ combination.

In one preferred example, the following steps are included:

(a) The surface of the porous current collector is pre-treated;

(b) The current collector treated in step (a) and precursors to prepare catalyst (soluble salt with the catalyst composition) are mixed. By in-situ combination method, catalyst is in-situ deposited or grown on the current collector to form the composite air electrode.

More preferably, following steps are included:

(a) The surface of the porous substrate is cleaned and pre-treated;

(b) The current collector treated in step (a) and precursors to prepare catalyst (soluble salt with the catalyst composition) are mixed. By in-situ combination method, catalyst is in-situ deposited or grown on the current collector to form the precursor of composite material.

(c) The phase of compound precursor is formed, followed by vacuum drying and subsequent treating process.

In one preferred example, solvothermal method, template method, electrophoretic deposition method, electroplating deposition method or electrostatic spray deposition method can be adopted for in-situ combination.

Preferably, the solvothermal methods as mentioned include hydrothermal and organic solvothermal methods and so on.

Preferably, the template methods include alumina template, surfactant soft template method and so on.

The electrophoretic deposition methods include constant speed and isoelectric focusing electrophoretic deposition methods, etc.

The electroplating deposition methods include potentiostatic, cyclic voltammetry and galvanostatic electroplating deposition methods.

Second aspect of the present invention is to provide a lithium-air battery with the said lithium air electrode.

The invention also provides the lithium-air battery containing the air electrode as mentioned.

DESCRIPTION OF THE PREFERRED EMBODIMENTS

Figure 1:
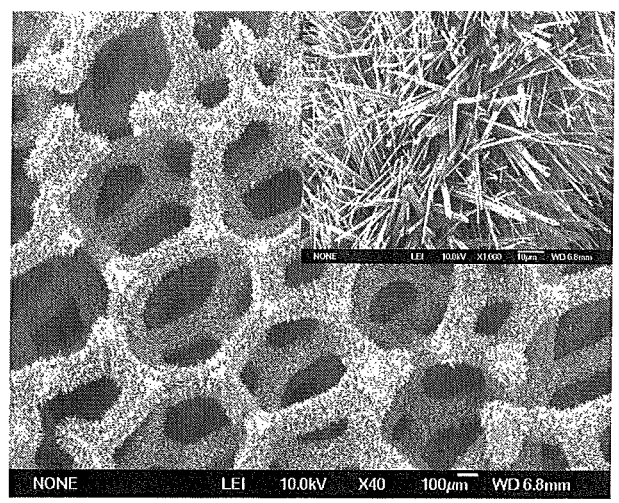
FIG. 1 showing the SEM images of the air electrode obtained in Example 1 of $Co_3O_4$ @ on collector Ni foam FIG. 2 The first charge and discharge curves of the electrodes from Comparative example 1 and Example 2.
Figure 2:
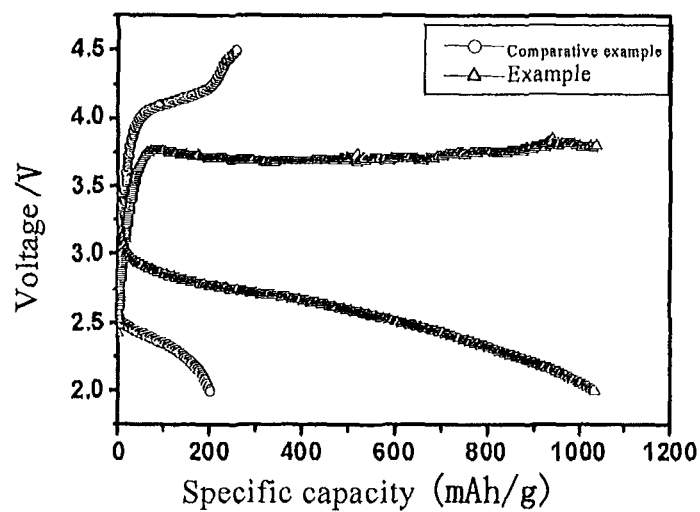
Figure 3:
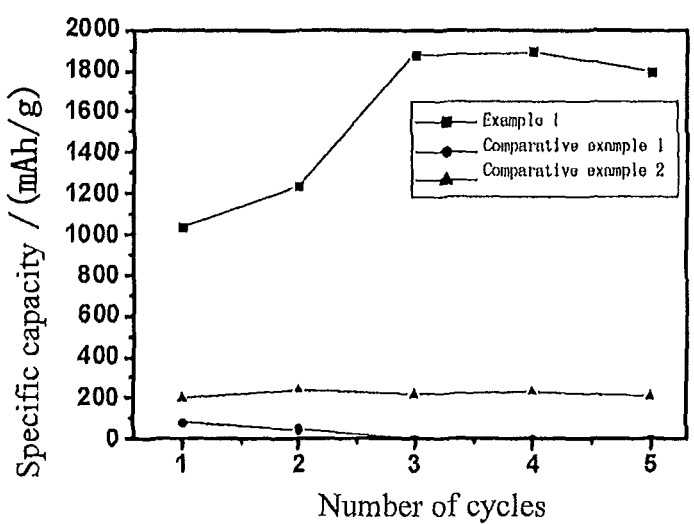
FIG. 3 is specific capacity changes with the number of cycles with the electrode from Comparative example 1, Comparative example 2 and the Example 1.

The present inventors have conducted extensive and in-depth research, by improving the preparation process, accidentally get a dramatic increase in performance of lithium-air battery with a lithium air electrode. On this basis, the inventors complete the present invention.

The technical conception of this invention is as follows:

According to the major origin of restriction on actual specific capacity of lithium-air battery by air electrode, which has been explored by the inventor, this invention proposes a novel structure of air electrode. The air electrode is merely comprised of catalyst and current collect without the use of other inactive additives. The method of this invention is to use kinds of techniques to in-situ deposit high-performance electrochemical catalyst for oxygen reaction with various morphologies on current collectors directly and uniformly as cathodes of lithium-air battery without the use of any support or binder. In this way, the content of inactive materials in air electrode is minimized on the premise of ensuring the content of catalyst. Normalized with the mass of total air electrode, this air electrode with composite structure delivered a first discharge specific capacity of more than 1000 mAh/g at 0.1 mA/cm$^2$, a reversible capacity up to 1800 mAh/g after several cycles and a high specific capacity of 3218 mAh/g at 0.02 mA/cm$^2$. With the same catalyst, the novel air electrode of catalyst@current collector obviously lowers the charge voltage plateau of lithium-air battery. All kinds of techniques employed is easy to handle and suitable for large-scale production.

In this invention, the "in-situ" as mentioned means directly preparing catalyst on the current collector. The in-situ composite structure as described achieves the designed integrative electrode consisting of current collector and catalyst. Preferably, the catalyst spreads uniformly over the surface of current collector, which can be fibers and even expanded to morphologies of tubes, rods or needles etc, forming a porous network structure together with current collector.

In the invention, "the three-dimensional network structure" is referred to the open-framework structure distributed in three-dimensional space uniformly.

In the invention, "the lithium-air battery" as mentioned means the kind of battery composed of metal lithium as anode, oxygen in the air as cathode and organic electrolytes. There are no specific restrictions on organic electrolytes as long as no limits for purpose of this invention, and the organic electrolytes are known by technicians in this area.

Unless otherwise defined or specified, all professional and scientific terms used here have the same meaning with which the technicians in this area are familiar. Besides, any methods or materials similar or equal to the information recorded can be applied in this invention.

Hereinafter all aspects of the invention will be described in detail. With no specific instructions, all the raw materials in this invention are commercially available or can be prepared using conventional methods in this area:

Current Collector

The current collector used in this invention can be commercially available, including but not limited to: continuous banding nickel foam (Changsha Liyuan New Material Co., Ltd.) and continuous nickel foam (Heze Tianyu Technology Development Co., Ltd.); or can also be self-prepared using methods in the literatures, for example by Wenjuan Niu, (Research progress of the preparation method of foam titanium and its alloys, Metallurgical Industry) or (Journal of Power Sources, 195 (2010) 7438-7444.)

Preferably, current collector with three-dimensional network structure is chosen.

In one particular embodiment, porosity of the current collector reaches over 90%, ppi (number of pores/inch)=100-300, and pore diameter is 10-500 μm. Measurement standards follow national standard of Foam GB (such as the national standard of nickel foam).

In one preferred example, measurement standards for pore diameter following the Foam national standard of GB (such as the national standard of nickel foam). Preferably, ppi is 100-140.

In one preferred example, the chosen current collector has electrical conductivity of 5-64 MS/m and redox potential of −0.250--1 V with porous structure, which can be measured by metal material conductivity tester and standard electrode potential method respectively.

To be specific, the following current collectors are chosen:
(I) porous metallic current collector, preferably nickel foam, titanium foam, gold foam or platinum foam current collector; or
(II) porous non-metallic current collector, preferably carbon foam or porous silicon current collector.

Catalyst

Catalysts in this invention can be common catalysts for lithium battery which are commercially available.

Specifically, catalyst has catalytic activity demonstrated with oxygen evolution reaction potential range of 3.1V-4.5V and oxygen reduction reaction potential range of 2.5V-3.1V, measured by cyclic voltammetry method.

In this invention, the catalyst has good catalytic activity for both oxygen evolution and oxygen reduction reaction.

Preferably, the catalysts as mentioned are chosen from the following one or more of groups with electrochemical catalytic activity:
(I) Pure Metal, preferably Pt, Au, Ag, Au, Co, Zn, V, Cr, Pd, Rh, Cd, Nb, Mo, Ir, Os, Ru, Ni or their combinations; or alloys formed by metal elements mentioned above;
(II) Single metal oxide, specifically as $Co_3O_4$, $MnO_2$, $Mn_2O_3$, CoO, ZnO, $V_2O_5$, MoO, $Cr_2O_3$, $Fe_3O_4$, $Fe_2O_3$, FeO, CuO, NiO or their combinations;
(III) Mixed metal oxide, specifically as in Spinel, Pyrochlore, Perovskite or their combinations.

More Preferably, catalyst is $Co_3O_4$.

The loading of catalyst is determined according to need of the battery design. Usually, the as-mentioned catalyst loading is 1-10 mg/1 $cm^2$ of the current collector (also as the catalyst mass of catalyst per unit area of current collector).

In one preferred example, catalyst is distributed uniformly on the surface of the current collector. The catalyst can be fibers and even expanded to morphologies of tubes, rods or needles etc, forming a porous structure together with current collector. In one preferred example, volume equivalent diameter of the catalyst is 100 nm-1000 nm. The volume equivalent diameter as mentioned refers to the diameter of an assumed regular shaped object that has the same volume as the irregular one.

In one preferred example, the air electrode of lithium-air battery as mentioned consists of current collector, catalyst loaded on the current collector without binder. More preferably, the air electrode of lithium-air battery as mentioned consists of current collector and the in-situ combined catalyst directly loaded on the current collector The inventors find that cycle efficiency of the battery can be enhanced by loading catalyst on the current collector, as the charge voltage plateau of lithium-air battery is obviously lowered while the discharge voltage plateau is increased.

Air Electrode of Lithium-Air Battery and its Preparation Methods

The air electrode of this invention as mentioned consists of:
Current collector
Catalyst which is in-situ loaded on the current collector mentioned above The invention provides the preparation method for air electrode for lithium-air battery, including:
Provide current collector;
Load catalyst onto the current collect by in-situ combination.

In one preferred example, the following steps are included:
(a) The surface of the porous current collector is pre-treated;
(b) The current collector treated in step (a) and precursors to prepare catalyst (soluble salt with the catalyst composition) are mixed. By in-situ combination method, catalyst is in-situ deposited or grown on the current collector to form the composite air electrode.

More preferably, following steps are included:
(a) The surface of the porous substrate is cleaned and pre-treated;
(b) The current collector treated in step (a) and precursors to prepare catalyst (soluble salt with the catalyst composition) are mixed. By in-situ combination method, catalyst is in-situ deposited or grown on the current collector to form the precursor of composite material;
(c) The phase of compound precursor is formed, followed by vacuum drying and subsequent treating process.

The catalyst precursors as mentioned are known to technicians in this area, such as soluble salt containing catalyst ions, including nitrates, carbonates, phosphates and so on.

The in-situ combination method as mentioned is known to technicians in this area, as long as catalyst can be in-situ synthesized loading on the current collector. (for example, as recorded by Wang etc, in Chemistry of Materials 21 (2008) 5112-5118)

For instance, solvothermal method, template method, electrophoretic deposition method, electroplating deposition method or electrostatic spray deposition method can be adopted for in-situ combination.

Preferably, the solvothermal methods as mentioned include hydrothermal and organic solvothermal methods and so on.

Preferably, the template methods include alumina template, surfactant soft template method and so on.

The electrophoretic deposition methods include constant speed and isoelectric focusing electrophoretic deposition methods, etc.

The electroplating deposition methods include potentiostatic, cyclic voltammetry and galvanostatic electroplating deposition methods.

Lithium-Air Battery

The invention also provides the lithium-air battery containing the air electrode as mentioned.

The lithium-air battery as mentioned can have other allowable components such as anode and electrolyte. No specification is required for these components as long as there are no limits for purpose of this invention.

The other components of the lithium-air battery are known, as described by Abraham etc in Journal of The Electrochemical Society, 143 (1996) 1-5 and Read etc in Journal of The Electrochemical Society, 149 (2002) A1190-A1195.

The other aspects of this invention are obvious for technicians in this area due to the disclosure of this article.

Next, the invention will be further illustrated with specific examples. It should be understood that these examples are only used to more clearly explain this invention rather than imposing restrictions on the scopes of it. For experimental methods with no concrete conditions indicated in the following examples, they are usually conducted under normal conditions or according to the conditions suggested by manufacturers. Unless otherwise described, all the part ratios are by weight, all the percentages are weight percentages and molecule weight of polymer is the number average molecular weight.

All professional and scientific terms used in this paper have the same meaning with those that the technical staffs are familiar with unless otherwise defined or description. Any methods and materials similar or equalize to the description here can be used in this invention.

To further describe the content, characteristics and significant progress of this invention, following comparative examples and examples are listed. But the invention is not limited to the examples.

Comparative Example 1

The mixture of $Co_3O_4$ catalyst, acetylene black and polyvinylidene fluoride (PVDF) with a mass ratio of 19:11:15 was dispersed in N-methyl pyrrolidone (NMP) to form slurry. The slurry was spread on a piece of nickel mesh and dried. The prepared electrode film works as cathode. The lithium metal foil worked as the anode. Polypropylene film from Celgard Inc. U.S. worked as the separator. The electrolyte was 1 M $LiPF_6$/PC. The charge/discharge test was conducted under 0.1 mA/cm$^2$ within the voltage range of 2~4.5 V. The active substance was calculated on the base of the mass of the whole air electrode except for the nickel mesh. The results are shown in Table 1.

Comparative Example 2

The $Co_3O_4$ catalyst and polyvinylidene fluoride (PVDF) were mixed with a mass ratio of 19:15. And the electrode was prepared in the same way described in Comparative example 1. The battery assembly and test conditions were the same to Comparative example 1. The results are shown in Table 1.

Comparative Example 3

The electrolytic manganese dioxide (EMD) (as catalyst), acetylene black and polyvinylidene fluoride (PVDF) were mixed with a mass ratio of 19:11:15. And the electrode was prepared in the same way described in Comparative example 1. The results are shown in Table 1.

Example 1

(1) $Co(NO_3)_2$ (10 mmol), $NH_4NO_3$ (5 mmol), $H_2O$ (35 ml) and $NH_3H_2O$ (15 ml) were mixed by magnetic stirring for 10 min. Then the solution was transferred into a watch glass with a lid and pretreated under 90° C. for 2 hours. (2) Nickel foam was skimmed in acetone, soaked in 6.0 M HCl for 15 min and rinsed with distilled water. Then the nickel foam was soaked in 0.1 mmol/L $NiCl_2$ aqueous solution for 4 hours and rinsed with distilled water. The pre-treated nickel foam in (2) was added to the watch glass in (1) and treated under 90° C. for 12 hours, rinsed with distilled water, dried under 60° C. for 2 hours, and calcined under 300° C. for 2 hours. Then the $Co_3O_4$ @ Ni electrode can be achieved. The battery assembly and test conditions were the same to Comparative example 1. The test results are shown in Table 1. The loading amount of catalyst is shown in Table 1. The catalyst showed a fiber-like morphology with a length of 1000 nm. The nickel foam had a ppi (pore/inch) of 140, and the pore size was 400 μm. The data shown in Table 1 indicates that the composite structure electrode has an improved discharge performance with a higher specific capacity compared to Comparative examples 1 and 2. The electrode has a significant lower charge voltage platform than the Comparative examples with the same catalyst.

Example 2

The $Co_3O_4$ @ Ni electrode was prepared in the same method described in Example 1. The battery assembly was the same to Comparative example 1. The test condition is 0.02 mA/cm$^2$, 2~4.5 V. The results in Table 1 show that an extremely high specific capacity can be achieved under lower current density.

Example 3

(1) $Mn(CH_3COO)_2$ (25 mmol), $Na_2SO_4$ (25 mmol) and $H_2O$ (50 ml) were mixed by magnetic stirring for 10 min. Then the solution was transferred into a three-electrode electrolysis cell; (2) Nickel foam was skimmed in acetone, soaked in 6.0 M HCl for 15 min, rinsed with distilled water. Then the nickel foam was soaked in 0.1 mmol/L $NiCl_2$ aqueous solution for 4 hours and rinsed with distilled water. The pre-treated nickel foam of (2) is added to the electrolysis cell of (1) as the working electrode. The saturated calomel electrode (SCE) worked as the reference electrode. A piece of Pt foil with large area worked as the counter electrode. Potentiostatic electrolysis was carried out at 0.6 V (vs. SCE) for 15 min. Then the nano needle electrolytic manganese dioxide (EMD) @ Ni air electrode can be achieved. The battery assembly and test conditions were the same to comparative example 1. The results are shown in Table 1. The catalyst loading amount is shown in Table 1. The catalyst shows a needle-like morphology with a diameter of 50~100 nm. The data shown in Table 1 indicates that the EMD@Ni has a significantly improved discharge performance with a higher specific capacity compared to Comparative example 3. The EMD@Ni electrode has a significant lower charge voltage platform than the Comparative examples with the same catalyst.

Example 4

The electrolyte, nickel foam treatment and three-electrode system are the same as Example 3. The electrolysis process started with a cyclic voltammetry method (voltage range: 0.6~0.3 V (vs. SCE); scan rate: 250 mV/s) for 30 s and then carried out potentiostatic electrolysis at 0.6 V (vs. SCE) for 1.5 min. Repeat this process for 15 min. Then the porous EMD @ Ni air electrode was achieved. The battery assembly and test conditions were the same as of Comparative example 1. The test results are shown in Table 1. The data shown in Table 1 indicates that the porous EMD @ Ni electrode has a significantly improved discharge performance with a higher specific capacity compared to Comparative example 3. The porous EMD @ Ni electrode has a lower charge voltage platform than the Comparative example with the same catalyst.

Example 5

The electrolyte, nickel foam treatment and three-electrode system are the same as of Example 3. The electrolysis process was carried out through a cyclic voltammetry method (voltage range: 0.6~0.3 V (vs. SCE); scan rate: 250 mV/s) for 15 min. Then the EMD nano rode @ Ni air electrode can be achieved. The battery assembly and test conditions were the same as of Comparative example 1. The test results are shown in Table 1. The catalyst loading amount is shown in Table 1. The catalyst shows a nano rod morphology with a diameter of 200 nm. The data shown in Table 1 indicates that the EMD nano rode @ Ni electrode has a significantly improved discharge performance with a higher specific capacity compared to Comparative example 3. The composite structure electrode has a significantly lower charge voltage platform than the Comparative example with the same catalyst.

Example 6

The electrolyte, nickel foam treatment and three-electrode system are the same to Embodiment 3. The electrolysis process was carried out through a cyclic voltammetry method (voltage range: 0.4-0.1V (vs. SCE); scan rate: 500 mV/s) for 15 min. Then the EMD nanotube @ nickel foam air electrode can be achieved. The battery assembly and test conditions were the same to Comparative example 1. The test results are shown in Table 1. The catalyst loading amount is shown in Table 1. The catalyst shows a nanotube morphology. The inner and outer diameters are 150 nm and 200 nm respectively. The data shown in Table 1 indicates that the EMD nanotube @ Ni electrode has a significantly improved discharge performance with a higher specific capacity compared to Comparative example 3. The EMD nanotube @ Ni electrode has a significantly lower charge voltage platform than the Comparative example with the same catalyst.

Example 7

(1) 0.3 wt % $NH_4F$ and 2 vol % of deionized water to glycol solution was magnetically stirred for 10 min, and then transferred into the three-electrode electrolysis cell; (2) Ti mesh was ultrasonically washed in acetone and ethanol and then dried in $N_2$ atmosphere. The Ti mesh of (2) was applied to the electrolytic cell of (1) as the working electrode, the large area Pt foil as the cathode, $TiO_2$@Ti was obtained after anodic oxidation under potentiostatic 60 V for 30 min, followed by washing with deionized water and heating at 400° C. for 3 h; (3) The obtained $TiO_2$@Ti was added to solution of 0.002M Pb $(CH_3COO)_2 \cdot 3H_2O$ with 80 ml deionized water, and then heated at 280° C. in $N_2$ atmosphere for 6 h. The $PbTiO_3$ nanowires in 100 nm @ Ti electrode was obtained after be washed with deionized water and dried in vacuum, with the diameter of 100 nm. The PPI (number of holes/inch) of the Ti mesh is 200, pore size 50 μm.

Example 8

(1) 60 mM $Pd(NH_3)_4Cl_2$, 40 mM $NH_4Cl$ was magnetic stirred for 10 min (pH=7) and then transferred into a three-electrode electrolysis system; porous Si was polished, ultrasonic cleaned with acetone and ethanol, and dried in $N_2$ atmosphere. (2) One side of Alumina (AAO) template (the side where Au film was sputtered) was connected with the porous Si via a silver conductive adhesive as the working electrode. The other side of aluminum oxide (AAO) template was etched with 5 wt % $HgCl$, and then reacted with 5 wt % phosphoric acid solution for 20 min to remove the barrier of the AAO; the electrode obtained in (2) was applied to the electrolytic cell (1) as the working electrode, a saturated calomel electrode as a reference electrode and a large-area Pt foil as the counter electrode. After the potentiostatic electrolysis for 120 min at −1 V (vs SCE), the working electrode was treated in 5 wt % NaOH solution to get rid of the AAO template, and then washed in deionized water and dried in vacuum. The diameter of the Pb nanowires is 100 nm in the Pd@Si. The PPI (number of holes/inch) of the porous Si is 150, pore size is 300 μm.

TABLE 1

| | Loading mass on the current collector (mg $cm^{-2}$) | Current density (mA $cm^{-2}$) | Fist discharge capacity (mAh) | Fist discharge specific capacity (mAh $g^{-1}$) | Charge voltage platform (V) |
|---|---|---|---|---|---|
| Comparative example 1 | 6 | 0.1 | 1.201 | 200.2 | 4.1-4.5 |
| Comparative example 2 | 6 | 0.1 | 0.5 | 83.3 | 4.1-4.5 |
| Comparative example 3 | 6 | 0.1 | 1.8 | 300.1 | 4.3-4.5 |
| Example 1 | 8 | 0.1 | 8.272 | 1034.1 | 3.68-3.8 |
| Example 2 | 8 | 0.02 | 25.745 | 3218 | 3.65-3.7 |
| Example 3 | 0.1 | 0.1 | 0.810 | 810 | 3.7-4.2 |
| Example 4 | 0.1 | 0.1 | 1.220 | 1220 | 3.7-4.2 |
| Example 5 | 0.1 | 0.1 | 0.680 | 680 | 3.7-4.2 |
| Example 6 | 0.1 | 0.1 | 1.530 | 1530 | 3.7-4.2 |

Discussion

The data in Table 1 shows that all the prepared composite structure air electrodes have a relatively high discharge specific capacity and low charge voltage platform. The performance has been improved significantly compared to the air electrodes in the Comparative examples.

The examples mentioned above illustrated the preferable embodiment. They are not used to limit the substantial range of the invention. The range of technical content of this invention is defined in the claims. Any alteration, change or amendment, will be assumed as being covered in the range of the claims.

All the documents cited herein are incorporated into the invention as reference, as if each of them is individually incorporated. Further, it would be appreciated that, in light of the above described teaching of the invention, the skilled in the art could make various changes or modifications to the invention, and these equivalents would still be within the scope of the invention defined by the issued claims of the application.

The invention claimed is:

1. An air electrode for a lithium-air battery, comprising:
   a collector; and
   an in-situ catalyst that is directly deposited or grown in-situ on the wherein the collector has a porosity rate of ≥90% 100 to 300 psi (number of holes/inch), and a pore diameter of 10-500 μm, terminated by BD national standards.

2. The air electrode of claim 1, wherein the air electrode is without binder.

3. The air electrode of claim 1, wherein the collector is selected from a porous collector group which has the electron conductivity of 5 to 64 MS/m and the redox potential of −0.250 to −1V, determined by metal material conductivity tester and the standard electrode potential method.

4. The air electrode of claim 1, wherein the in-situ catalyst has an oxygen evolution reaction potential in a range of 3.1-4.5 V and an oxygen reduction potential in a range of 2.5-3.1 V, determined by cyclic voltammetric method.

5. The air electrode of claim 1, wherein the in-situ catalyst has a loading amount of 1-10 mg of the in-situ catalyst per 1 $cm^2$ of the collector.

6. The air electrode of claim 1, wherein the in-situ catalyst has a volume equivalent diameter of 100 nm-1000 nm.

7. A method for preparation of an air electrode of a lithium-air battery of claim 1, comprising:
   (A) providing the collector; and
   (B) forming an in-situ catalyst on the collector by direct deposit or growth of a catalyst in-situ on the collector.

8. The method of claim 7, wherein the step (B) is performed in accordance with an in-situ method selected from the group consisting of a solvothermal method, a template method, electrophoretic deposition, electroplating deposition, and electrostatic spray deposition method.

9. A lithium-air battery containing an air electrode as claimed in claim 1.

10. The air electrode of claim 1, wherein the collector is a porous metal collector or a porous non-metallic collector.

11. The air electrode of claim 10, wherein the porous metal collector is selected from the group consisting of metal Ni foam, Ti foam, Au foam, and Pt foam.

12. The air electrode of claim 10, wherein the porous non-metallic collector is selected from the group consisting of C foam and porous Si.

13. An air electrode for a lithium-air battery, comprising:
   a collector; and
   an in-situ catalyst that is loaded in-situ on the collector,
   wherein the collector has a porosity rate of ≥90%, 100 to 300 ppi (number of holes/inch), and a pore diameter of 10-500 μm, terminated by GB national standards.

* * * * *